United States Patent [19]

Cortiula

[11] Patent Number: 5,715,002
[45] Date of Patent: Feb. 3, 1998

[54] MULTIPLE OUTPUT CCD TYPE CHARGE TRANSFER READ REGISTER

[75] Inventor: Jean-Alain Cortiula, Claix, France

[73] Assignee: Thomson-CSF Semiconducteurs Specifiques, Paris, France

[21] Appl. No.: 626,796

[22] Filed: Apr. 2, 1996

[30] Foreign Application Priority Data

Apr. 4, 1995 [FR] France ................................ 95 03949

[51] Int. Cl.$^6$ ................................................... H04N 5/335
[52] U.S. Cl. ............................................. 348/316; 348/315
[58] Field of Search ................................ 348/294, 303,
348/304, 311, 315, 316, 317, 321, 322,
323, 324; 257/239, 241, 240; 377/60; H04N 5/335

[56] References Cited

U.S. PATENT DOCUMENTS

| | | | |
|---|---|---|---|
| 4,647,977 | 3/1987 | Tower | 348/321 |
| 4,665,440 | 5/1987 | Tromborg . | |
| 4,710,725 | 12/1987 | White et al. . | |
| 4,979,035 | 12/1990 | Uehara et al. . | |
| 5,073,908 | 12/1991 | Cazaux | 377/62 |
| 5,286,989 | 2/1994 | Yonemoto | 348/311 |
| 5,291,294 | 3/1994 | Hirota | 348/316 |
| 5,422,503 | 6/1995 | Cazaux et al. . | |

FOREIGN PATENT DOCUMENTS

| | | |
|---|---|---|
| 0 329 189 | 8/1989 | European Pat. Off. . |
| 59-075772 | 4/1984 | Japan . |
| 2 180 717 | 4/1987 | United Kingdom . |

OTHER PUBLICATIONS

IBM Technical Disclosure Bulletin, vol. 24, No. 3, Aug. 3, 1981, New York U.S., pp. 1670–1671, W.J. Craig, "Selectable Multiple Port Scanning Array".

*Primary Examiner*—Andrew Faile
*Assistant Examiner*—Tuan V. Ho
*Attorney, Agent, or Firm*—Oblon, Spivak, McClelland, Maier & Neustadt, P.C.

[57] ABSTRACT

A CCD type charge-transfer photosensitive device (Z1) comprises a photosensitive zone (Z2) formed by at least one line of pixels and designed for the conversion, into electrical charges, of the photons coming from an image and a non-photosensitive zone designed to remove the charges generated in the photosensitive zone and comprising a read register (RL) consisting of transfer stages (ET), the charges generated in a pixel of the photosensitive zone (Z1) being collected in a transfer stage of the read register, wherein the read register (RL) is formed by Q elementary sub-registers $R_j$ ($j=1, 2, \ldots, Q$), each elementary sub-register being formed by a whole number $M_j$ of transfer stages (ET) enabling the transfer of the charges from the first-order stage up to the M order stage, M possibly being different for two different elementary sub-registers, and a read diode located in the M order transfer stage so as convert the variations of charges collected at the terminals of the diode into voltage variations. The disclosure can be applied especially to the photosensitive devices requiring the removal of the charges at a high rate.

16 Claims, 7 Drawing Sheets

MULTIPLE OUTPUT CCD TYPE CHARGE TRANSFER READ REGISTER

BACKGROUND OF THE INVENTION

1. Field of the Invention

The present invention relates to a read register using the principle of the transfer of charges.

CCD type charge transfer read registers are used, for example, in photosensitive devices enabling the conversion of a light image into electrical charges.

Such photosensitive devices generally comprise two zones: a photosensitive zone designed to convert the photons coming from the image into electrical charges and a non-photosensitive zone designed to remove the charges generated in the photosensitive zone.

The photosensitive zone is formed by numerous elementary photosensitive elements commonly called pixels, and takes the form of a linear array or matrix.

The non-photosensitive zone contains a read register whose output stage is a charge/voltage converter constituted by a reading diode and a reading amplifier.

The invention shall be described more particularly with respect to the case where the photosensitive zone takes the form of a linear array and adjoins a non-photosensitive zone constituted solely by a read register. However, the invention also relates to the case where the photosensitive takes the form of a matrix and where the non-photosensitive zone is formed not only by the read register but also by a memory zone formed by a set of shift registers.

For certain applications such as, for example, those requiring the removal of the charges at a high rate, it is necessary to increase the number of outputs of one and the same read register.

2. Description of the Prior Art

Several approaches have been envisaged to date to increase the number of outputs.

A first approach consists in splitting up the read register into two registers, a so-called even-parity register and a so-called odd-parity register. The even-parity register then recovers the charges that have collected in the even-parity pixels of the photosensitive zone and the odd-parity register recovers the charges that have collected in the odd-parity pixels of the photosensitive zone.

In one improvement of this approach, each of the even-parity and odd-parity registers is split up into two half-registers and there are thus obtained four outputs, identical to the reference photosensitive detector II-C5 produced by the firm DALSA INC.

The drawback of such an approach is that it takes up a great deal of space owing to the charge/voltage converter that has to be placed at the end of each of the four half-registers. It is then not possible to obtain a large number of outputs.

Another approach consists in sub-dividing the read register into several sub-registers and bending the end of each sub-register to which the charge/voltage converter is connected. The amount of space taken up by each read amplifier then entails fewer penalties. It is then possible to obtain a larger number of outputs than with the above-described approach.

However, this approach has another drawback. The transfer stages forming the elbows contain no useful information at all following the transfer of the charges from the photosensitive zone to the read register. For example, a sub-register with 64 useful transfer stages (the term useful stage is understood to mean the stages that recover charges during the transfer of the charges from the photosensitive zone to the read register) contains on an average eight non-useful stages (a non-useful stage must be understood to mean the stages of the elbow that recover no charge at all during the transfer of the charges mentioned here above). The number of clock strokes needed to remove the charges from a register with an elbow structure such as this is then greater than the number of clock strokes that will be needed to remove the charges from a register having no elbows. This results in a reduction of the frequency of removal of the charges. In terms of percentage, the reduction of the frequency of removal of the charges is equal to the ratio of the number of non-useful charges to the number of useful charges. For the example chosen, this reduction is therefore 12.5%.

The invention does not have these drawbacks.

SUMMARY OF THE INVENTION

The invention relates to a photosensitive device comprising a photosensitive zone formed by at least one line of pixels and designed for the conversion, into electrical charges, of the photons coming from an image and a read register designed for the removal of the charges generated in the photosensitive zone, the read register having as many transfer stages as there are pixels in the line, each transfer stage being capable of collecting the charges coming from a respective pixel of the line, wherein the read register is formed by Q elementary sub-registers $R_j$ ($j=1, 2, \ldots, Q$) each formed firstly by a whole number $M_j$ of transfer stages (ET) enabling the collection of the charges from corresponding pixels of the photosensitive line and the transfer of the charges collected from the first-order stage up to the $M_j$ order stage, and secondly a read diode located in the $M_j$ order transfer stage.

As shall be seen, the Q sub-registers are preferably juxtaposed so as to be aligned with one another.

The read diode conventionally enables the conversion into voltage variations of the variations in charges collected at its terminals. These charges are firstly the charges that are collected directly by the $M_j$ order transfer stage and come from the same-ranking pixel and secondly the charges transmitted by successive shifts of the read register. The read diode is connected in principle to a read amplifier enabling the amplification of the voltage variations at the terminals of the diodes.

In other words, the invention proposes the interposing, in the read register, of the intermediate output points that are not at the ends of the register and are arranged to enable the direct collection of the signals coming from the corresponding pixels of the photosensitive zone. In the prior art, the register outputs do not collect charges coming directly from the pixels. In this way, according to the invention, the output register can be divided into several sub-registers each having its output, without however having to modify the regular pitch of the pixels of the photosensitive zone at the position of the transition between registers. The $M_j$ order stage may indeed have the same overall size as the other stages. It is formed differently since it comprises the read diode. In the simplest case of a two-phase register with four electrodes per transfer stage, the $M_j$ order transfer stage has, in the same width as each of the other transfer stages, three electrodes and one read diode but it is also capable of receiving the charges of a pixel during the overall transfer of charges between the photosensitive zone and the read register.

Advantageously, the read register according to the invention enables the removal of all the charges that it contains in the very short time that is taken to remove the charges from a single elementary sub-register. It is then possible to simultaneously process the signals coming from each elementary sub-register.

BRIEF DESCRIPTION OF THE DRAWINGS

Other features and advantages of the invention shall appear from the following description of a preferred embodiment, made with reference to the appended drawings, of which.

MORE DETAILED DESCRIPTION

In all the figures, the same references designate the same elements.

Figure 1:
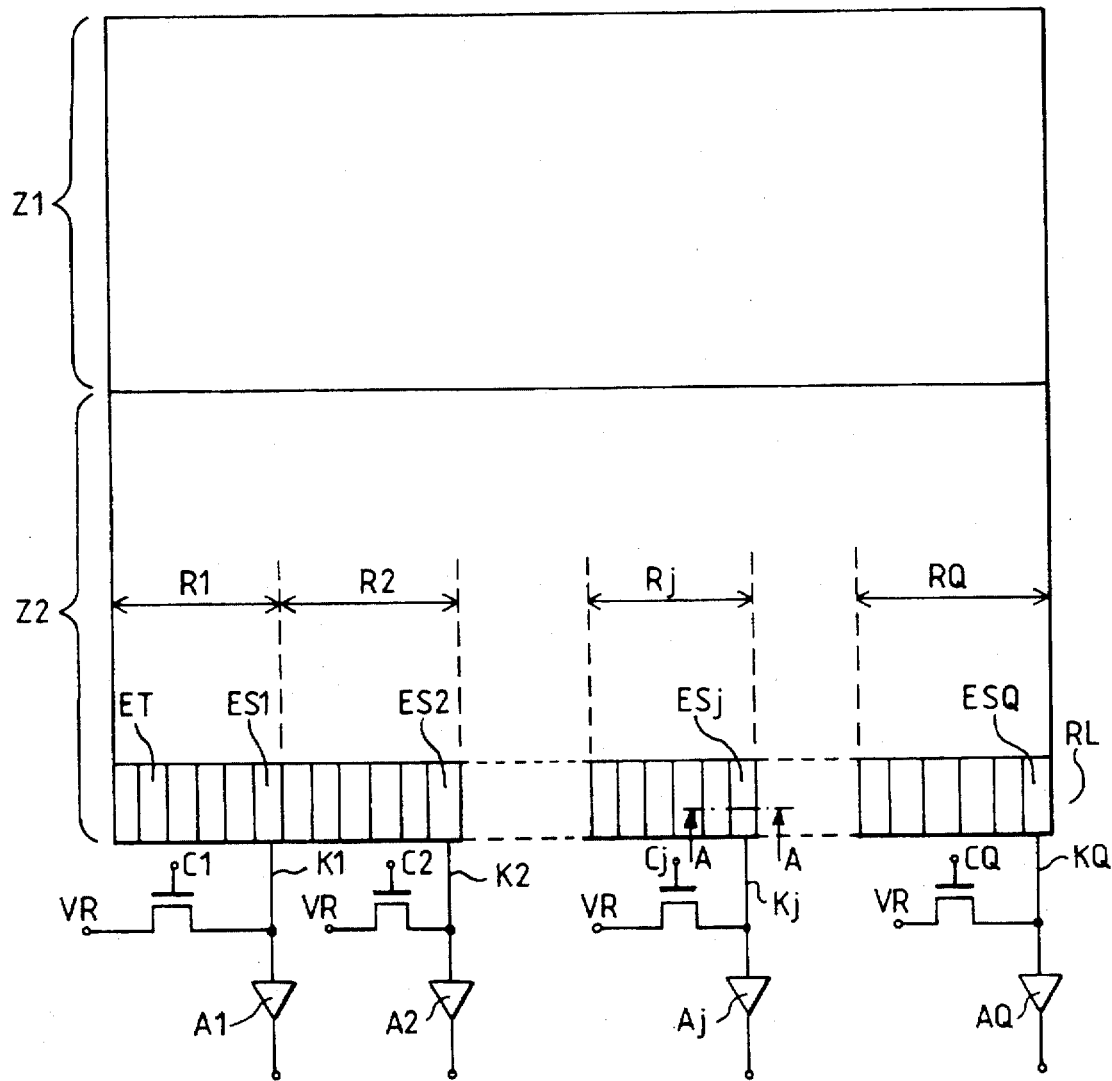
FIG. 1 is a drawing showing the principle of the read register according to the invention.

FIG. 1 is a diagram showing the principle of the photosensitive device according to the invention.

The photosensitive device is formed by a photosensitive zone Z1 and a non-photosensitive zone Z2. The photosensitive zone is not shown in detail in FIG. 1. As mentioned here above, it is formed in a manner known per se by several elementary photosensitive elements, commonly called pixels. The pixels of the photosensitive zone are arranged so as to form at least one line of pixels.

The non-photosensitive zone Z2 has a shift register RL formed by transfer stages ET arranged so that each transfer stage collects the charges generated in a corresponding pixel of the line of pixels of the photosensitive zone. The non-photosensitive zone Z2 may be limited solely to the read register RL. It may also contain, in addition to the read register, a memory zone formed by a set of shift registers in columns. In the latter case, the memory zone is arranged in lines of cells, each cell possibly containing the charges of a respective pixel of the line (or one of the lines) of the photosensitive zone and the last line of cells being adjacent to the read register.

For convenience's sake, the invention shall therefore be described more particularly with respect to the case where the photosensitive zone Z1 takes the form of a linear array formed by a line of pixels and where the non-photosensitive zone Z2 is reduced solely to the read register RL. The transposition to the case of a non-photosensitive memory zone is immediate: the last line of charge storage cells fulfils the same role as the photosensitive line in that charges corresponding to a pixel of a photosensitive line may be transferred from one cell of the last line of cells to a respective transfer stage of the read register.

The read register RL is formed by Q sub-registers (R1, R2, ..., Rj, ..., RQ) and each sub-register comprises M transfer stages. For convenience's sake, the number M has been chosen, by way of an example, to be equal to 6. The invention however pertains to other embodiments where M is any whole number also capable of being different for two different sub-registers. The M transfer stages of each sub-register Rj succeed one another so that the transfer of the charges is done from the first-order stage towards the M order stage. According to the invention, the read diode of the charge/voltage converter of each j order sub-register Rj is integrated into the M order transfer stage of the sub-register Rj. This transfer stage is referenced ESj in FIG. 1 and shall hereinafter be called an intermediate output stage.

Advantageously, the read register RL according to the invention is such that the transfer stages of the sub-registers Rj (j=1, 2, ..., Q) succeed one another so that the intermediate output stage ESj of the sub-register Rj adjoins the first-order stage of the sub-register Rj+1.

Should the photosensitive zone take the form of a linear array, the invention relates not only to the embodiment as described in FIG. 1, but also to the embodiment for which each sub-register Rj may, for example, be sub-divided into an even-parity sub-register and an odd-parity sub-register.

The charge/voltage converter of each sub-register Rj is constituted on the whole by the read diode contained in the intermediate output stage ESj of a MOS transistor Tj and a read amplifier Aj. The MOS transistor Tj, under the action of the command Cj applied to its gate, carries out a pre-charging of the capacitor of the diode before the arrival of the charge conveyed in the sub-register Rj. The transistor Tj may be, for example, an N type MOS transistor whose drain is connected to a supply voltage VR and whose source is connected to the cathode of the diode and to the input of the read amplifier Aj.

As mentioned here above, one advantage of the invention consists of the elimination of the elbowed outputs that exist in the prior art devices. The frequency of removal of charges is thereby improved.

The new distribution of the elements constituting the charge/voltage converter of each sub-register Rj is another advantage of the invention. Indeed, according to the invention, the charge/voltage converter of each sub-register Rj is distributed so that the read diode is included in the terminal transfer stage of the sub-register Rj and so that the read amplifier is located in a zone external to the zone defined by the succession of transfer stages. The link between the read diode and the read amplifier of each sub-register Rj is then obtained by an electrically conductive connection Kj whose axis is preferably perpendicular to the direction defined by the sequence of transfer stages. An architecture of this kind advantageously enables the making of the read amplifiers of different types. These read amplifiers may entirely or partly be integrated or not integrated into the component to which the transfer stages belong. Exemplary embodiments of such read amplifiers shall be given here below (see FIGS. 6 and 7).

Consequently, while the transfer stages from the first-order stage to the M-1 order stage have two functions, namely on the one hand the collection (in the vertical direction) of photosensitive charges coming from the pixels of a photosensitive line and, on the other hand, the transfer (in the horizontal direction) of these charges from one stage to another of the sub-register, the last transfer stage, which is the M order stage, has an additional function: the charge/voltage conversion of the charges collected vertically or transferred horizontally. This last stage is therefore constituted differently from the others. In particular, it has a read diode but it does not take up an additional place (horizontally) so that the pitch of the pixels of the photosensitive lines is not modified (or in any case very little modified) at the position of the connection between two adjacent sub-registers.

Figure 2:
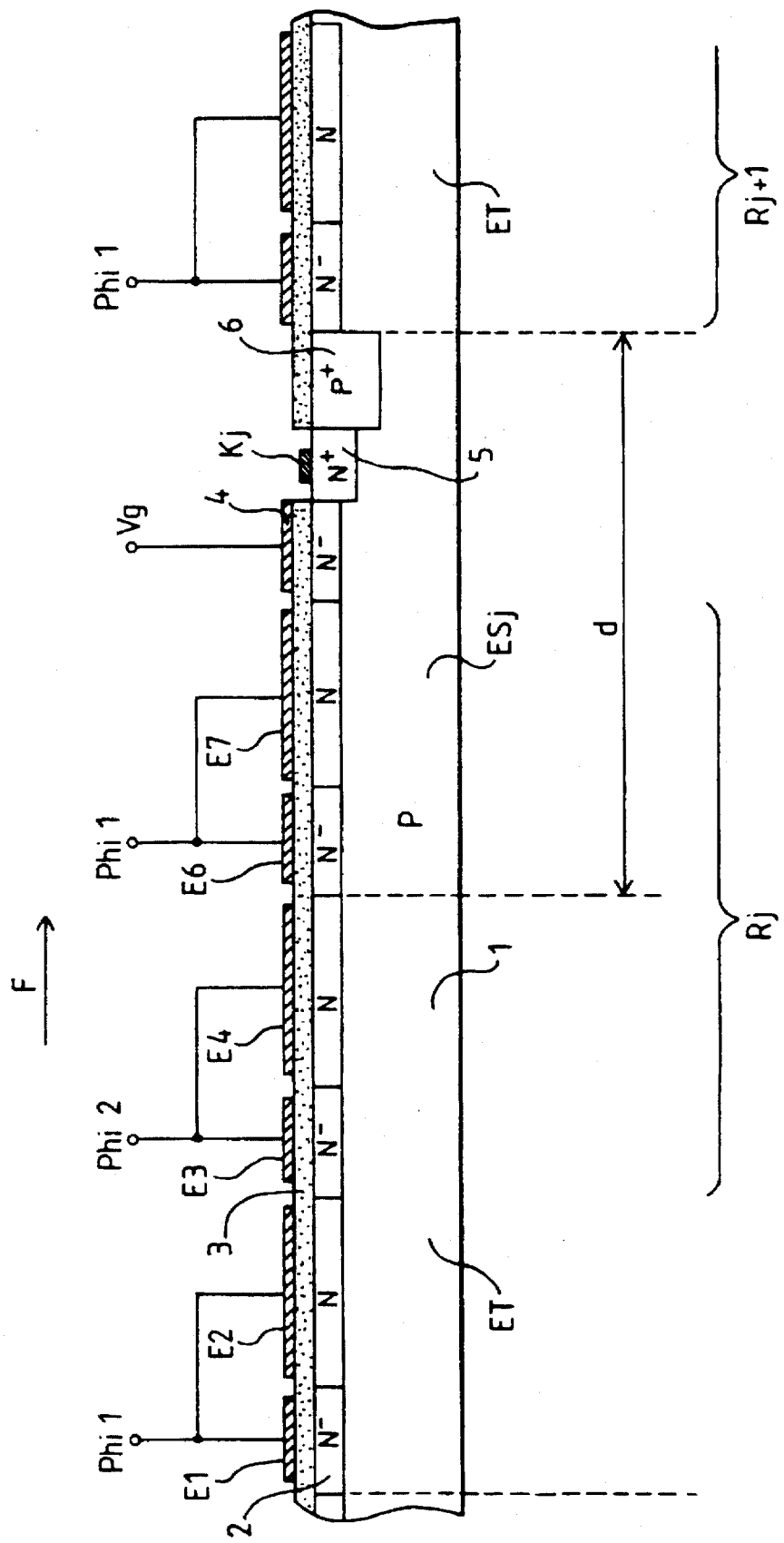
FIG. 2 shows a view, along the section A—A of FIG. 1, of a first embodiment of the invention.

FIG. 2 shows a view, along the section A—A of FIG. 1, of a first embodiment of the invention.

FIG. 2 shows a fraction of the j order sub-register Rj as well as a fraction of the j+1 order sub-register Rj+1. The fraction shown of the sub-register Rj+1 is constituted by a known type of transfer stage ET and by the intermediate output stage ESj. The fraction shown of the sub-register Rj+1 is a fraction of the known type of transfer stage ET that adjoins the intermediate output stage ESj.

For example, the transfer mode chosen is of the two-phase type. In this case, as shall be seen, the M order transfer stage has three electrodes and one diode adjacent to the third electrode, the entire unit being contained in the same horizontal width as the four electrodes of each of the other transfer stages. The invention relates however to transfer modes wherein the number of phases is greater than two.

The transfer stage ET is formed in a P doped substrate 1. An N doped layer 2 covers the substrate 1 so as to form a buried channel. As is known to those skilled in the art, in two-phase mode, the N doped layer 2 is formed by a succession of alternately N-doped and N doped zones. The term N- doped zone is understood to mean a zone with N doping but where the doping is in a lower proportion than in an N doped zone. An electrically insulating layer 3 covers the doped layer 2. The electrodes that enable the transfer are made above the electrically insulating layer 3.

According to the two-phase transfer mode chosen as an example, four electrodes E1, E2, E3, E4 participate in the transfer of the charges in the stage ET.

In the direction F defined as going from the sub-register Rj to the sub-register Rj+1, the four successive electrodes E1, E2, E3, E4 respectively cover the N-, N, N- and N doped zones of the buried channel 2. The two electrodes E1 and E2 are connected to the same phase Phi1 and the two electrodes E3 and E4 are connected to the same phase Phi2.

The phases Phi1 and Phi2 are adjusted in a known way so as to provide for the transfer of the charges from the transfer stage ET of the sub-register Rj to the intermediate output stage ESj of the same sub-register.

The intermediate output stage ESj is thus formed in the P doped substrate 1. In the direction of transfer of the charges, the intermediate output stage successively comprises two electrodes E6 and E7 connected to the same phase Phi1, an output electrode 4 to which a voltage Vg is applied, an N+doped zone 5 and a P+doped zone 6, these zones 5 and 6 being both formed in the substrate 1.

The read diode is formed by the junction between the N+doped zone and the P doped substrate 1.

The electrodes E6 and E7 are located on the surface of the electrically insulating layer 3 and respectively cover an N- doped zone and an N doped zone of the buried channel 2. The electrode 4 too is located at the surface of the layer 3 and covers an N- doped zone. The voltage Vg applied to the electrode 4 enables the transfer of the charges into the read diode. The P+doped zone 6 forms an insulation barrier between the sub-register Rj and the sub-register Rj+1. The voltage that appears at the terminals of the read diode is applied to the input of the read amplifier by means of the conductive connection Kj.

During the transfer of the charges from the photosensitive zone to the read register, the intermediate output stage recovers the charges that have collected in the pixel adjoining it. Advantageously, the transfer of the charges to the output amplifier of each sub-register is then done without any idle time.

Another advantage of the invention consists of the fact that it is possible, for example, to associate a read diode with a single pixel of the photosensitive zone. The frequency of removal of the charges may then go up to some gigapixels per second.

According to the preferred embodiment of the invention, the N+doped zone 5 stretches in the direction perpendicular to the direction of propagation of the charges throughout the width of the intermediate output stage. It follows therefrom that the electrical field that enables the acceleration of the charges towards the diode is constant. Since the acceleration of the charges is uniform, their transfer too is thus done as uniformly and therefore as speedily as in the prior art.

The prior art reading sub-registers have their ends elbowed. In order to minimize the space taken up by these ends, the size of the transfer stages of the prior art sub-registers is limited. It follows therefrom that the quantity of charges transferred is also limited. For example, the transfer stages of the read register of the prior art can generally, at each clock stroke, transfer only a maximum quantity of charges of the order of 250,000 electrons. The transfer stages of the read register of the invention do not have this limitation. For example, an intermediate output stage that has a length d of about 15 μm in the direction of propagation of the charges and a width of about 40 μm in the direction perpendicular to the direction of propagation of the charges may advantageously achieve a transfer, at each clock stroke, of a quantity of charges of the order of one million electrons.

Figure 3:
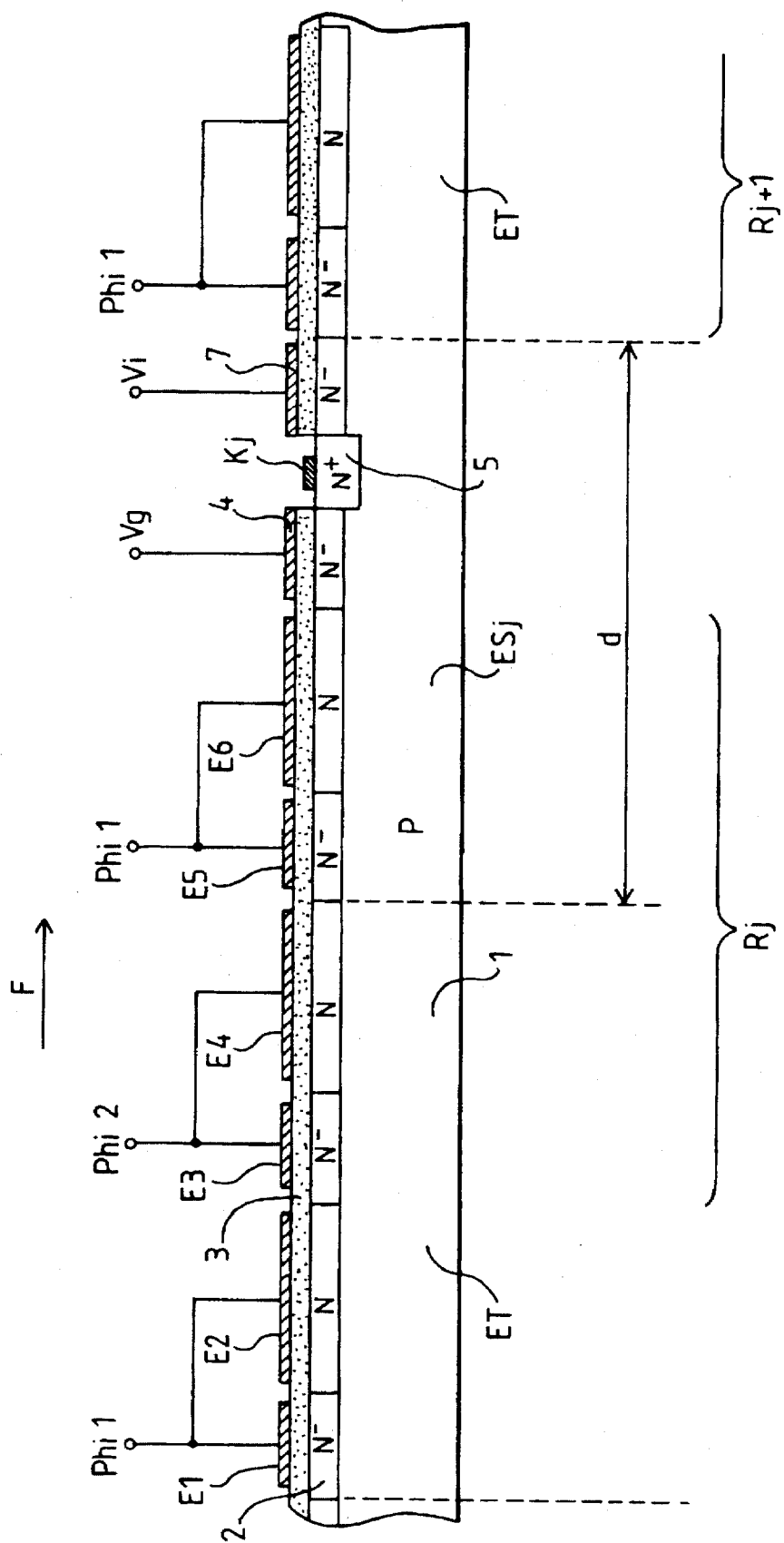
FIG. 3 shows a view, along the section A—A of FIG. 1, of a second embodiment of the invention.

FIG. 3 shows a view, along the section A—A of FIG. 1, of a second embodiment of the invention.

Like FIG. 2, FIG. 3 shows a fraction of the j order sub-register Rj as well as a fraction of the j+1 order sub-register Rj+1. The transfer mode chosen is of the two-phase type but, as mentioned here above, the invention also relates to transfer modes wherein the number of phases is greater than two.

The transfer stages ET shown in FIG. 3 are identical to those shown in FIG. 2. This is also the case with the intermediate output stage ESj except in relation to the element enabling the formation of the insulation barrier between the sub-register Rj and the sub-register Rj+1. According to the embodiment of FIG. 3, the insulation barrier is formed by an electrode 7 to which a potential Vi is applied. The electrode 7 is located at the surface of the layer 3 and covers an N- doped zone.

Figure 4:
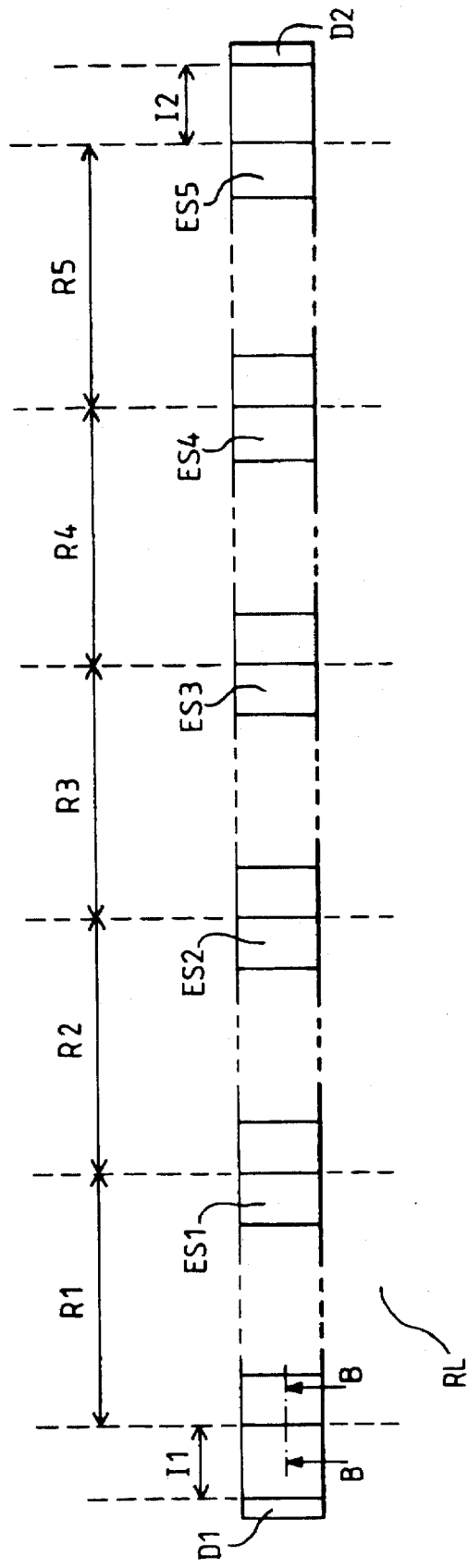
FIG. 4 shows an improvement of a read register according to the invention.

FIG. 4 shows an improvement of a read register according to the invention.

This improvement advantageously makes it possible to avoid the reading of the charges contained in the transfer stages located at the ends of the read register.

As is known to those skilled in the art, the read register has a succession of transfer stages at both its ends, receiving no charge arising out of the detection of the photons that come from the image to be converted. For certain uses, a part of these transfer stages is used to define the black reference.

Generally however, all or a part of these stages contain no useful information. The clock strokes pertaining to the reading of the residual charges that they contain slow down the removal of the charges that represent the useful information. The proposed improvement enables this drawback to be resolved.

Advantageously, the proposed improvement enables another drawback to be resolved. As is known to those skilled in the art, the reading of the charges detected in the pixels located on the edge of the photosensitive zone leads to the appearance of parasitic effects.

The improvement made in the read register according to the invention enables the elimination of the reading of the charges liable to create parasitic effects. It follows therefrom that the proposed improvement makes it possible to give an image without parasitic effects in an optimum period of time.

The read register RL shown in FIG. 4 comprises, by way of an example, five sub-registers R1, R2, R3, R4, R5. Each sub-register Rj (j=1, 2, 3;, 4, 5) comprises an intermediate output stage Esj.

According to the preferred embodiment of the proposed improvement, the read register comprises a first drain D1 located at a first end of the register RL and a second drain D2 located at the second end of the register. The drain D1 enables the removal of the charges contained in the transfer stages of the zone I1 located at the first end of the register RL while the drain D2 enables the removal of the charges contained in the transfer stages of the zone I2 located at the second end of the register. The zones I1 and I2 contain, firstly, the transfer stages that receive no charge arising out of the detection of the photons coming from the image to be converted and, secondly, the transfer stages whose reading is liable to create parasitic effects. Generally, the zones I1 and I2 contain respectively p and q transfer stages, p and q being whole numbers that could be equal. Each removal drain is constituted, for example, by an N+doped zone covered with a metal electrode.

According to the preferred embodiment described here above, the proposed improvement relates to the two ends of the read register. According to other embodiments, however, it is possible for the proposed improvement to concern only one end.

According to the proposed improvement, it should be possible to remove charges in two opposite directions within one and the same register.

Figure 5:
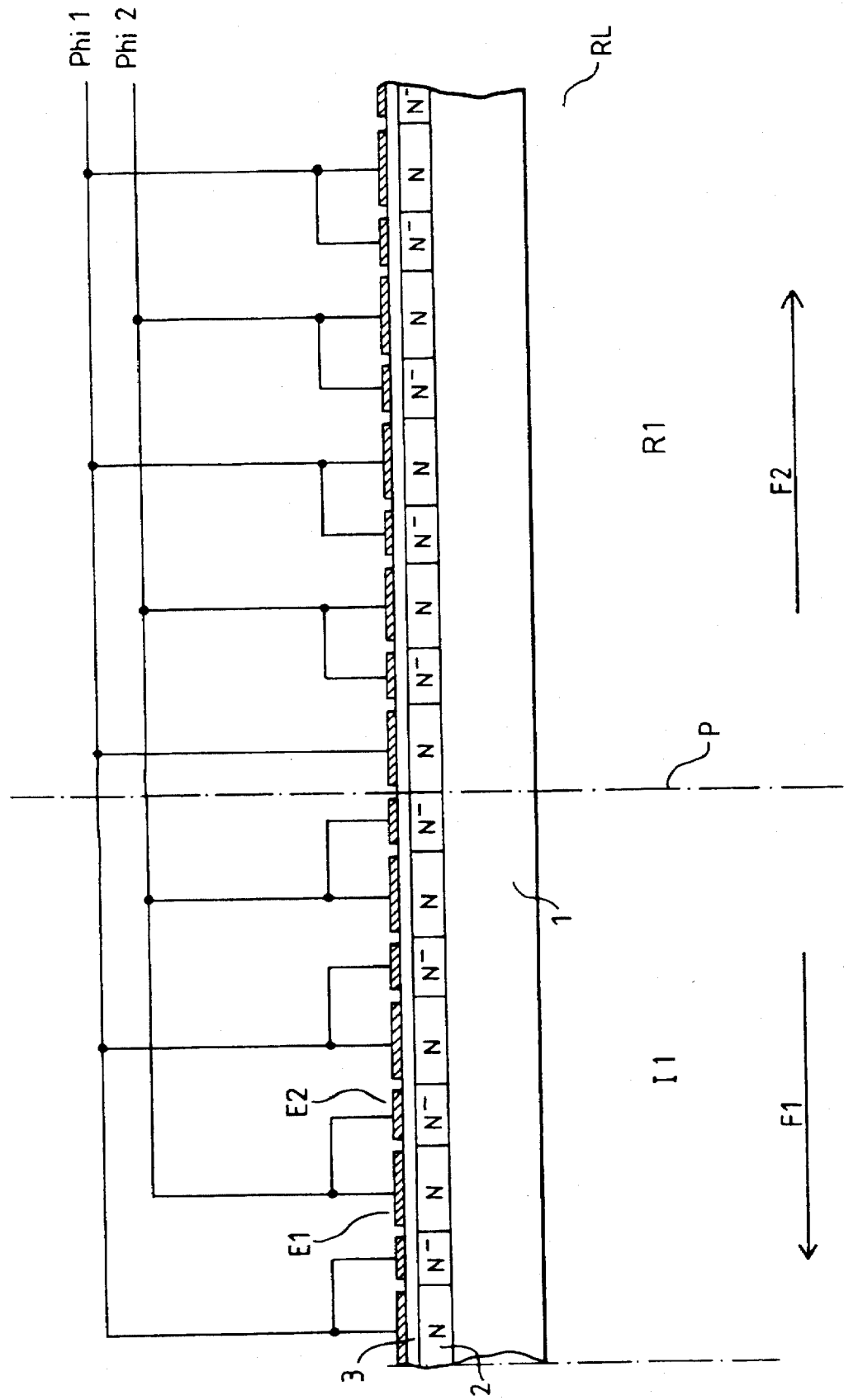
FIG. 5 shows a view along the section B—B of FIG. 4.

The diagram of FIG. 5 shows how such a result can be obtained.

FIG. 5 shows a fraction of the zone I1 as well as a fraction of the sub-register R1 that adjoins the zone I1. The transfer mode is of the two-phase type but the proposed improvement relates to other transfer modes.

As mentioned here above, the N doped layer 2 is formed by a succession of alternately N- and N doped zones.

Each N doped zone is covered with an electrode E1 and each N- doped zone is covered with an electrode E2. The electrodes E1 which succeed one another are connected alternately to the phases Phi1 and Phi2. During the transfer of the charges from the photosensitive zone into the read register, the phases Phi1 and Phi2 are adjusted in a known way so that the charges collect in the N doped zones beneath the electrodes E1 connected to the phase Phi2.

According to the proposed improvement, the phases applied to the electrodes E1 and E2 enable the charges located in the zone I1 of the register RL to shift in the direction F1 that points towards the drain D1 while the charges located in the sub-register R1 which adjoins the zone I1 is shifted in the direction F2 opposite F1.

To this end, each electrode E2 located in the zone I1 is connected to an electrode E1 located in this same zone so that the direction of shift F1 is established as going from the plane P, between the zone I1 and the sub-register R1, towards the drain D1. As shown in FIG. 5, the electrodes that succeed one another in the direction F1 are of the type E2, E1, E2, E1 etc.

It is then possible, in the zone I1, starting from the plane P, to define odd-parity and even-parity electrodes E1 as also odd-parity and even-parity electrodes E2. The charges transferred from the photosensitive zone to the read register RL are located beneath the odd-parity electrodes E1 (1, 3 ... ). In order to ensure the transfer of the charges contained in the zone I1 to the drain D1, the odd-parity electrodes E1 and E2 are connected together to the same phase Phi2 and the even-parity electrodes E1 and E2 are connected together to the same phase Phi1.

It is also possible, in the sub-register R1, to define odd-parity and even-parity electrodes E1 as also odd-parity and even-parity electrodes E2 on the basis of the plane P.

The charges coming from the transfer from the photosensitive zone to the read register RL are located beneath the even-parity electrodes E2 (2, 4 ... ). In order to set up the direction F2 of propagation of the charges towards the intermediate output stage ES1, the R(E2) order electrode E2 (where R(E2)=1, 3, 5, ... ) is connected to the R(E1) order electrode E1 (where R(E1)=2, 4, 6, ... ) so that R(E1)=R(E2)+1. The first-order electrode E1 is connected to no electrode E2 but only to the phase Phi1.

Since the direction of propagation of the charges is the same in all the sub-registers, it follows therefrom that the distribution of the electrodes and of the phases of the j order sub-registers, j being greater than 1, is identical to that described for the first-order sub-register.

The charges located in the zone I2 have a direction of shift identical to the direction F2. It follows therefrom that the electrodes of the transfer stages contained in the zone I2 are connected to the phases Phi1 and Phi2 in a way that is identical to that in which the electrodes of the transfer stages of the sub-registers Rj (j≧1) are connected to the phases Phi1 and Phi2.

Figure 6:
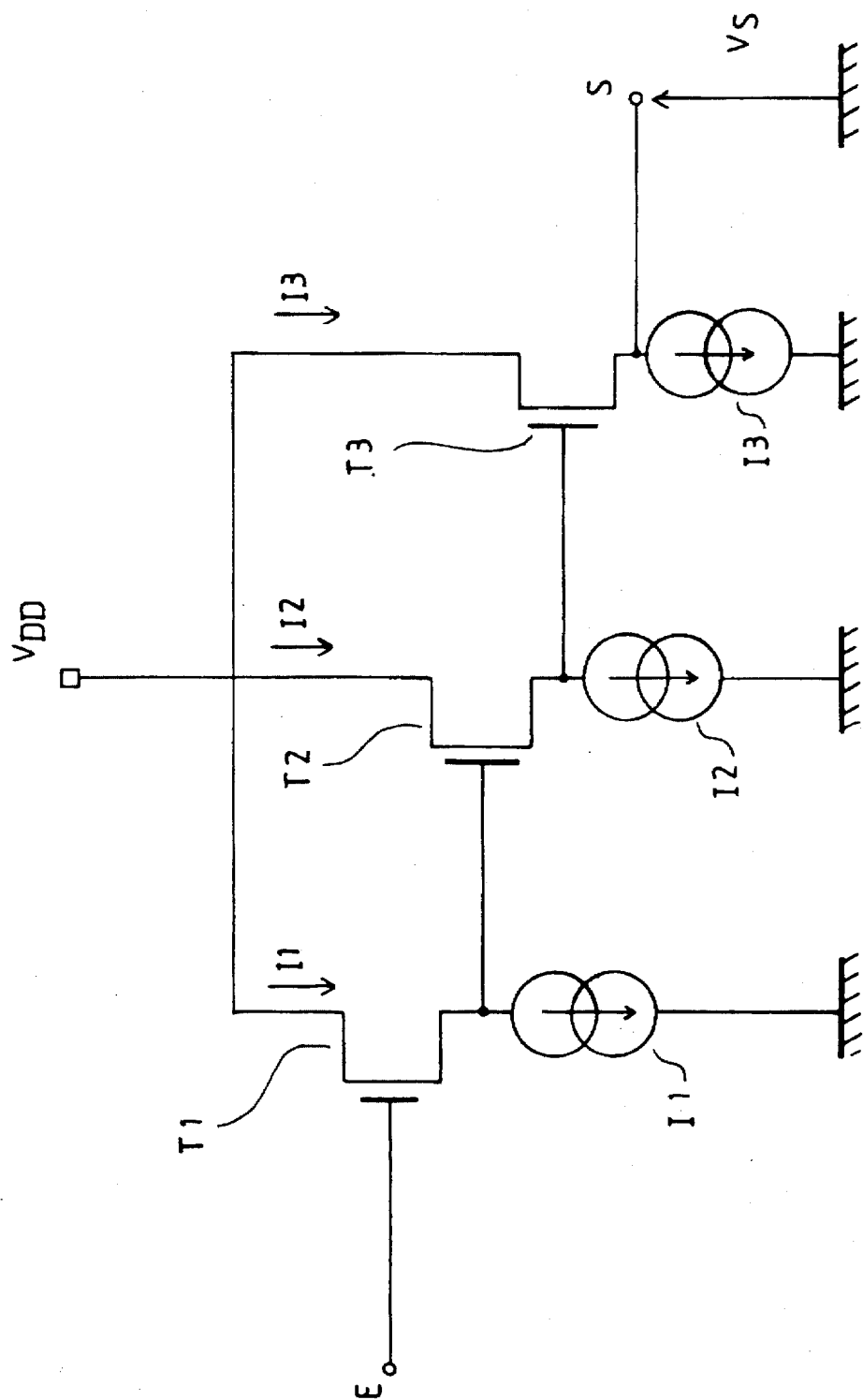
FIG. 6 shows an electrical diagram of a first read amplifier used according to the invention.

FIG. 6 shows the electrical diagram of a first read amplifier used according to the invention. The input and the output of the amplifier are respectively referenced E and S.

In the example chosen, the read amplifier is constituted by three successive amplification stages. Each amplification stage is constituted by a MOS transistor whose drain is connected to a supply voltage VDD and whose source is connected to the first terminal of a current generator, the other terminal of which is connected to the ground of the circuit. The first amplification stage is thus constituted by a transistor T1 and a current generator I1, the second stage by a transistor T2 and a current generator I2 and the third stage by a transistor T3 and a current generator I3. The source of the transistor T1 is connected to the gate of the transistor T2 and the source of the transistor T2 is connected to the gate of the transistor T3. The output transistor VS of the read amplifier is collected at the source of the transistor T3. The currents I1, I2 and I3 have increasing values. For example, the current I1 may be equal to 0.5 mA, the current I2 to 1 or 2 mA and the current I3 to 12 or 13 mA.

The sum of the currents I1+I2+I3 may therefore reach a value of the order of 15 mA. For a supply voltage VDD equal to 15 V, the power dissipated by the read amplifier thus reaches a value of about 0.23 watts. In general, the read amplifiers of this type are integrated into the chip constituted by the read register. It is then not possible to increase the number of outputs of one and the same read register to an excessively great number, otherwise excessive values of dissipated power will be attained in the register.

Figure 7:
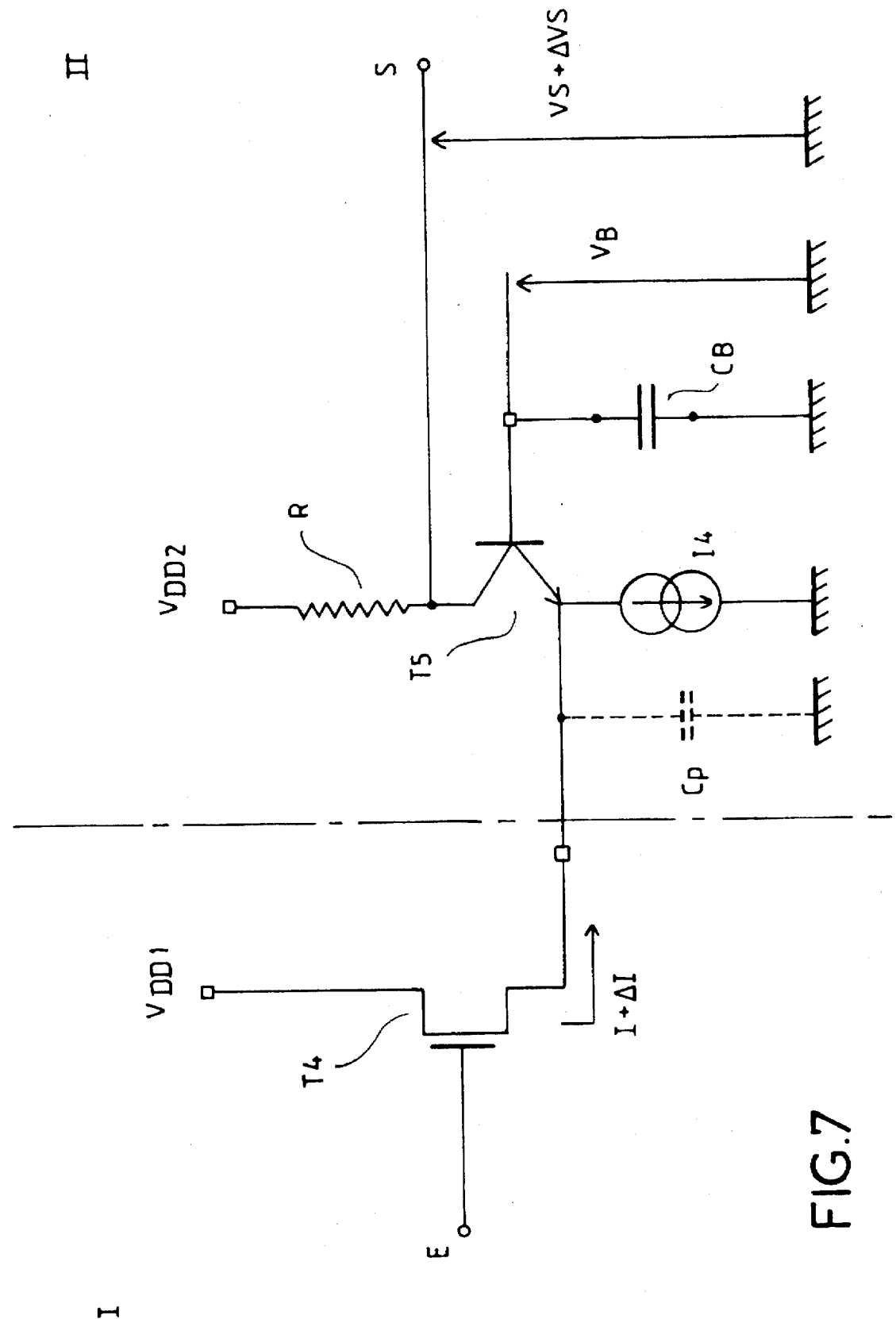
FIG. 7 shows an electrical diagram of a second read amplifier used according to the preferred embodiment of the invention.

The read amplifier shown in FIG. 7 enables this problem to be resolved.

FIG. 7 is divided into two zones. The elements located in the zone I are integrated into the chip containing the read register and the elements located in the zone II are external to this chip. The elements located in the zone II may be either discrete components or components integrated into one and the same chip.

According to the preferred embodiment, the read amplifier has a first amplification stage enabling the conversion into current variations of the voltage variations collected at the terminals of the read diode and a second amplification stage formed by a stage for the reading of the current variations external to the read register.

Preferably, the first amplification stage is formed by means of an N type MOS transistor T4 integrated into the read register and the second amplification stage is a common base type amplifier.

The MOS transistor T4 has its gate connected to the cathode of the read diode and its drain connected to a supply voltage VDD1. The source of the transistor T4 forms the output of the read register.

The current read stage is preferably a common base type amplifier formed by an NPN type bipolar transistor, the base of which is connected to the ground by means of a capacitor CB, the emitter of which is connected to the source of the transistor T4 and to the ground of the circuit by means of a current generator I4 and the collector of which is connected to a supply voltage VDD2, for example equal to 15 volts, by means of a resistor R. The value of the current I4 may be equal, for example, to 3 mA. The value of the capacitor CB is chosen so as to ensure the common base type assembly of the transistor T5. For example, this value may be equal to 100 nF. The current generator I4 may be replaced for certain applications such as those requiring high noise performance characteristics by a resistor.

A voltage VB is applied to the base of the bipolar transistor T5 so as to turn it on and to fix the drain-source voltage of the transistor T4. For example, the voltage VB may be equal to 7 volts. The bias current of the transistor T4 may then have a value ranging, for example, between 1 mA and 3 mA.

The reading of the charges at the terminals of the read diode is expressed by a variation of the voltage applied to the gate of the transistor T4. This results in a variation $\Delta I$ of the current I that flows through the transistor T4. This variation $\Delta I$ is given by the formula: $\Delta I = gm \, \Delta Vg$ where gm is the transconductance of the transistor T4 and $\Delta Vg$ is the variation of the voltage applied to the gate of the transistor T4. For example, the geometry of the transistor T4 may be chosen so that gm is equal to 0.5 mS.

The output voltage VS of the read amplifier is taken between the collector of the transistor T5 and the ground of the circuit. The variation $\Delta Vs$ of the voltage VS is written as follows:

$$\Delta VS = R\Delta I$$

As stated here above, the current I4 has a value of some mA, for example 3 mA, while the sum of the currents I1+I2+I3 of the device of FIG. 6 reaches 15 mA. Advantageously, the read amplifier described in FIG. 7 therefore enables a considerable reduction of the dissipated power in the read register owing to the reduction of the consumption of the read amplifier.

Advantageously, the power dissipated in the read register may also be reduced with respect to the power dissipated according to the configuration described in FIG. 6, owing to the diminishing of the supply voltage VDD1 with respect to the supply voltage VDD.

According to the amplifier described in FIG. 6, the voltage variations collected at the terminals of the diode lead to variations of the drain-source voltage of the transistors constituting the read amplifier. It is therefore necessary for the supply voltage VDD to be sufficiently high, for example equal to 15 volts, to ensure an accurate bias of the transistors T1, T2 and T3.

According to the amplifier described in FIG. 7, the first amplification stage of the read amplifier converts the voltage variations collected at the terminals of the diode into current variation. The drain-source voltage of the transistor T4 remains substantially constant. It is then not necessary for the voltage VDD1 to have as high a value as that of the voltage VDD. For example, the voltage VDD1 may be chosen to be equal to 13 volts.

The power dissipated by a read amplifier such as the one described in FIG. 7 may then be divided for example by a factor of about 10 as compared with the power dissipated by a read amplifier as described in FIG. 6. A read amplifier comprising, for example, 32 outputs can then be made.

Another advantage of the current reading according to the amplifier of FIG. 7 consists in eliminating the influence of the parasitic capacitor Cp (shown in dashes in FIG. 7) that results from the connection between the read register and the charge circuit external to the read register.

Advantageously, the common base type amplifier has an input impedance with a value that is low enough to short-circuit the capacitor Cp. It follows therefrom that the current read is not affected by the presence of this capacitor. In the case of the amplifier described in FIG. 6, on the contrary, the capacitance of the capacitor Cp cannot be overlooked in relation to the input impedance of the circuit external to the read register. The influence of the capacitor Cp may then lead to the deterioration of the passband of the charge/voltage converter.

Advantageously, the use of a read amplifier according to FIG. 7 does not have this drawback and it is then possible, for example, to reach passband values of the order of 240 MHz.

Another advantage of the read amplifier of FIG. 7 is that it enables the adjusting of the conversion factor Fc that links the variation $\Delta Vs$ of the output voltage to the collected charge $\Delta Q$.

$$F_c = \frac{\Delta VS}{\Delta Q}$$

now $\Delta Q = Cd\Delta Vg$, $\Delta Vg = \frac{\Delta I}{gm}$ and $\Delta VS = R\Delta I$.

we therefore get:

$$F_c = R \frac{gm}{Cd}$$

The modification of the resistance R then advantageously enables a variation of the conversion factor Fc.

The cutoff frequency of the passband of the charge/voltage conversion circuit can be written as follows:

$$f = \frac{1}{2\pi R C_o}$$

where R is the resistance defined here above and $C_O$ is the surrounding capacitance (not shown in the figure) at the collector of the bipolar transistor T5.

Whereas the conversion factor $F_c$ is proportional to R, the cutoff frequency f of the passband is inversely proportional to R. It follows therefrom that, for applications implementing relatively low cutoff frequencies, the conversion factor can reach advantageously high values.

For example, it is then possible to attain a conversion factor of about 16 µV per electron for a passband of the order of some $MH_z$.

According to the preferred embodiment described here above, the first amplification stage of the read amplifier is achieved by an N type MOS transistor and the second amplification stage by an NPN type bipolar transistor.

The invention however pertains to other embodiments.

It may pertain, for example, a read amplifier with its first amplification stage formed by a P type MOS transistor integrated into the component to which the transfer stages belong and its second amplification stage formed by a PNP type bipolar transistor external to the component to which the transfer stages belong. It is then the anode and no longer the cathode of the read diode that is connected to the gate of the MOS transistor T4.

It may also pertain to a read amplifier whose current read stage, external to the component to which the transfer stages belong, may be formed by any known current reading device such, as for example, an operational amplifier mounted as a current reader.

What is claimed is:

1. A photosensitive device comprising a photosensitive zone formed by at least one line of pixels and designed for the conversion, into electrical charges, of the photons coming from an image and a read register designed for the removal of the charges generated in the photosensitive zone, the read register having as many transfer stages as there are pixels in the line, each transfer stage being capable of collecting the charges coming from a respective pixel of the line, wherein the read register is formed by Q elementary sub-registers Rj (j=1, 2, . . . , Q), each formed firstly by a whole number Mj of transfer stages enabling the collection of the charges from corresponding pixels of the photosensitive line and the transfer of the charges collected from the first-order stage up to the Mj order stage, and secondly a read diode located in the Mj order transfer stage.

2. A device according to claim 1, wherein the Q sub-registers are juxtaposed so as to be aligned with one another, the M (ESj) order stage of the sub-register Rj adjoining the first-order stage of the sub-register Rj+1.

3. A device according to claim 2, wherein the width of the Mj order transfer stage is the same as the width of the other transfer stages.

4. A photosensitive device according to any of the claims 1 to 3, wherein the Mj (ESj) order transfer stage of each sub-register comprises electrodes connected to at least one of the phases making it possible to ensure the transfer of the charges into the sub-register, an electrode enabling said charges to be transferred into the read diode and an insulation barrier enabling the electrical insulation of the sub-register Rj and of the sub-register Rj+1.

5. A photosensitive device according to claim 4, wherein said barrier is constituted by a doped semiconductor zone.

6. A photosensitive device according to claim 4, wherein said barrier is constituted by a semiconductor zone covered with an electrode to which a potential (Vi) is applied.

7. A photosensitive device according to any of the claims 1 to 3, comprising a read amplifier connected to each read diode so as to amplify the voltage variations collected at the terminals of the diode.

8. A photosensitive device according to claim 7, wherein the read amplifier is constituted by at least one amplification stage constituted by a MOS transistor, the drain of which is connected to a supply voltage (VDD) and the source of which is connected to the first terminal of a current generator, the other terminal of which is connected to the ground of the circuit.

9. A photosensitive device according to claim 7, wherein the read amplifier comprises a first amplification stage enabling the conversion, into current variations ($\Delta I$), of the voltage variations ($\Delta Vg$) collected at the terminals of the read diode and a second amplification stage enabling a reading of said current variations to be made.

10. A photosensitive device according to claim 9, wherein the first amplification stage is a MOS transistor whose gate is connected to a first terminal of the read diode, the other terminal of which is connected to the ground of the circuit.

11. A photosensitive device according to claim 9, wherein the second amplification stage is a common base type of amplifier.

12. A photosensitive device according to claim 11, wherein the common base type amplifier is a bipolar transistor whose base is connected to the ground of the device by means of a capacitor, said base being connected to a voltage (VB) adjusted so as to turn said bipolar transistor on, the emitter of this bipolar transistor being connected to the source of the MOS transistor and to a first terminal of a current generator whose second terminal is connected to the ground of the device and whose collector, representing the output of the read amplifier, is connected to the supply voltage (VDD2) by means of a resistor.

13. A photosensitive device according to claim 12, wherein the MOS transistor is an N type transistor, the first terminal of the read diode is the cathode of said diode and the bipolar transistor is an NPN type transistor.

14. A photosensitive device according to claim 12, wherein the MOS transistor is a P type transistor, the first terminal of the read diode is the anode of said diode and the bipolar transistor is a PNP type transistor.

15. A photosensitive device according to any of claims 1 to 3, wherein the read register comprises, at least one of its ends, a drain and p transfer stages, the electrodes of which are connected to the phases that enable the transfer of the charges so that the charges contained by said p stages are removed by said drain.

16. A photosensitive device according to any of claims 1 to 3, wherein each elementary sub-register Rj contains only one transfer stage.

* * * * *